United States Patent [19]

Kurita et al.

[11] Patent Number: 5,672,110
[45] Date of Patent: Sep. 30, 1997

[54] TORQUE LIMITER HAVING AUTOMATIC RESET FUNCTION

[75] Inventors: Masahiro Kurita, Kuwana; Syoji Itomi, Jushiyama-mura; Yuji Okamoto, Kuwana, all of Japan

[73] Assignee: NTN Corporation, Osaka, Japan

[21] Appl. No.: 70,332

[22] PCT Filed: Sep. 28, 1992

[86] PCT No.: PCT/JP92/01272

§ 371 Date: May 28, 1993

§ 102(e) Date: May 28, 1993

[87] PCT Pub. No.: WO93/07401

PCT Pub. Date: Apr. 15, 1993

[30] Foreign Application Priority Data

| Sep. 30, 1991 | [JP] | Japan | 3-251597 |
| Jan. 31, 1992 | [JP] | Japan | 4-16187 |
| Apr. 30, 1992 | [JP] | Japan | 4-111281 |
| Jul. 30, 1992 | [JP] | Japan | 4-203775 |

[51] Int. Cl.[6] .................................................. F16D 7/02
[52] U.S. Cl. .......................................... 464/37; 192/45
[58] Field of Search .......................... 464/30, 34, 35, 464/37; 190/56 R, 45

[56] References Cited

U.S. PATENT DOCUMENTS

| 2,637,987 | 5/1953 | Hill et al. | 464/35 |
| 2,668,428 | 2/1954 | Hoover | 464/37 |
| 3,877,253 | 4/1975 | Yeague | 464/35 |
| 4,344,306 | 8/1982 | Citron | 464/34 |
| 4,610,340 | 9/1986 | Helmes et al. | 464/35 |

FOREIGN PATENT DOCUMENTS

| 0108930 | 5/1984 | European Pat. Off. |  |
| 0212381 | 3/1987 | European Pat. Off. |  |
| 0436270A1 | 7/1991 | European Pat. Off. |  |
| 2685414 | 6/1993 | France | 464/30 |
| 1681083 | 9/1991 | U.S.S.R. | 464/35 |
| 2-034-420 | 6/1980 | United Kingdom . |  |

*Primary Examiner*—Daniel P. Stodola
*Assistant Examiner*—Eileen A. Dunn
*Attorney, Agent, or Firm*—Nikaido, Marmelstein, Murray & Oram LLP

[57] ABSTRACT

A torque limiter adapted to be automatically reset after a long period of time. The inner ring (1) has a cylindrical surface (5). A polygonal engaging surface (9) is formed on the outer ring (2) by a leaf spring in the shape of a polygonal ring. A cage (11) having pockets is provided between the inner and outer rings (1, 2). Rollers (13) received in the pockets are adapted to engage the cylindrical surface (5) and the engaging surface (9) at the narrowest portions. The inner ring (1) has an eccentric surface (15) on which is supported a bearing (16) which holds the cage (11) in a diametrically offset position. An annular portion (20) of the cage (11) is brought into contact with an annular portion (19) of the outer ring (2). As the torque increases with the rollers (13) engaged, the leaf spring (8) is deformed and the rollers (13) pass through the engaging positions, so that the clutch is disengaged. The cage (11) is further rotated by the torque transmitted from the inner ring, kept in contact with the annular portion (19) of the outer ring. Creeping thus occurs and the cage and thus the rollers are moved slowly to the next engaging positions.

7 Claims, 11 Drawing Sheets

TORQUE LIMITER HAVING AUTOMATIC RESET FUNCTION

TECHNICAL BACKGROUND

This invention relates to a torque limiter having an automatic reset function.

BACKGROUND ART

In ordinary industrial machines, various means are used to transmit power by rotation, such as belts, pulleys, gears and shaft coupling. In order to increase the reliability of the entire machine and to prevent any fatal accident, an increasingly greater number of machines are provided with safety devices for preventing excessive loads on critical parts thereof.

It is especially important to provide a propeller engine of a small ship or a compression circuit in a compressor for a refrigerator with a safety device for cutting off torque transmission from the engine if the driven side is subjected to an excessive load.

Figure 20:
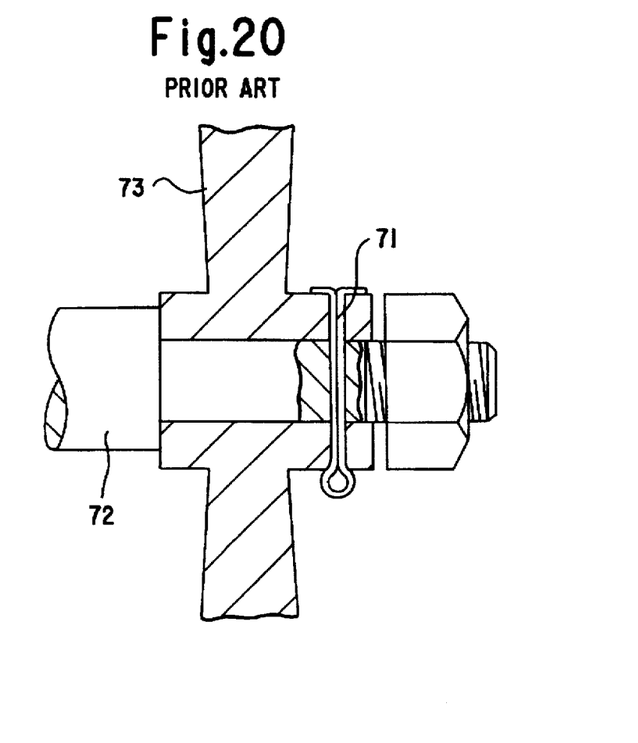
FIG. 20 is a view showing a prior art torque limiter.

A shear pin shown in FIG. 20 is one of such safety devices. This shear pin 71 is inserted between a driving shaft 72 and a driven member 75 (propeller in the illustrated example). If the driven member is subjected to an excessive load, the pin 71 is broken, allowing the driving shaft 72 to run idle.

But such a shear pin has to be replaced with a new one every time the driven member is repaired. Such a replacement is troublesome. If such a shear pin is used for a propeller shaft of a small ship, pins have to be replaced while on the sea. Such a job thus involves a lot of trouble and danger.

Figure 21:
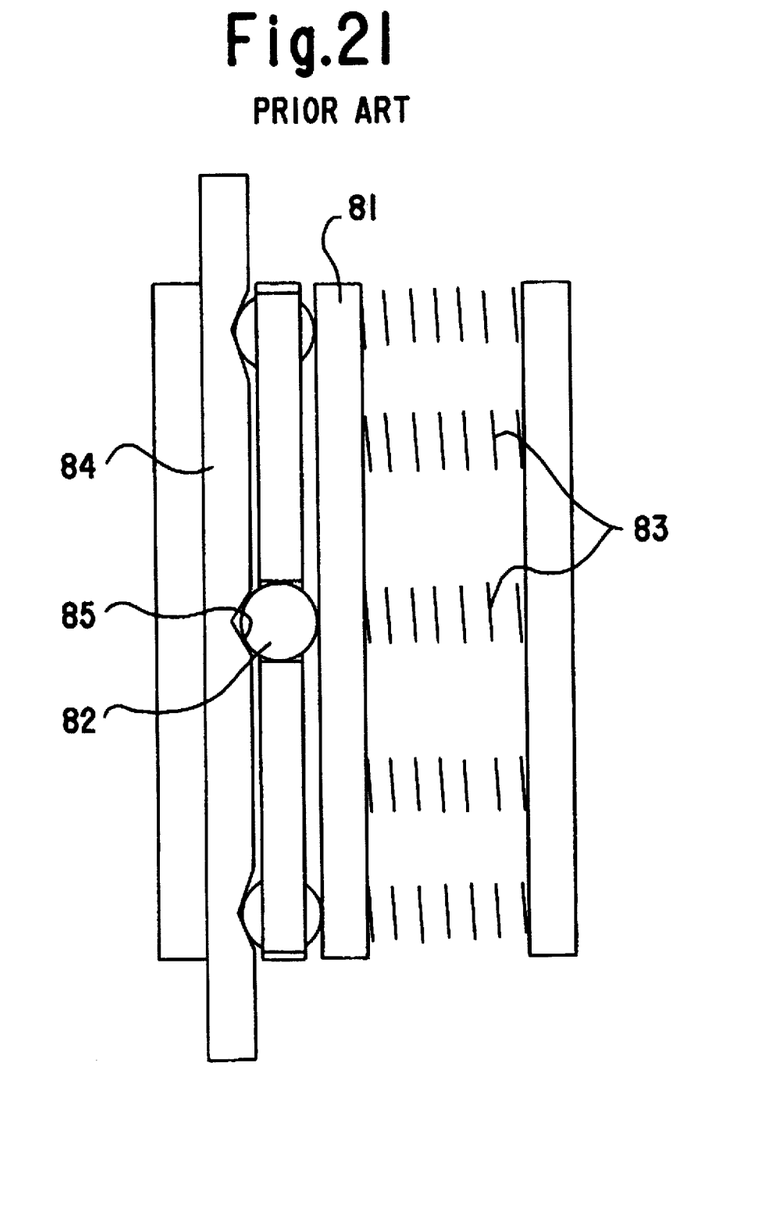
FIG. 21 is a view showing another prior art torque limiter.

A safety device of the type having an automatic reset function and thus usable repeatedly is known as a torque limiter, as shown in FIG. 21. This torque limiter has balls 82 held in position by a hub 81 coupled to a driven member and received in pockets 85 formed in a driving flange 84. Springs 83 are provided to bias the balls 82 against the pockets 85. If the hub 81 is subjected to an excessive load, the balls 82 get out of the pockets 85, thus cutting off torque transmission. As the driving flange 84 further rotates, each ball 82 will get into another pocket 85. The torque limiter is thus automatically reset and the hub 81 resumes its function.

With this type of torque limiter, automatic resetting occurs too soon before the driving side member and the driven side member make one rotation relative to each other. Thus, even if the torque limiter should stop due to some malfunction of the driven side, it will be automatically reset repeatedly at very short time intervals as far as the driving side is rotating at a high speed. For example, if the driving flange 84 is rotating at 1800 rpm, the balls 82 will repeatedly come into and out of the pockets at the rate of 350 times or more per second to restart torque transmission. This will not only wear the contact parts markedly but the device at the driven side will also be subjected to undue forces because it is restarted soon after it has failed.

It is therefore an object of this invention to provide a torque limiter which is adapted to reset not immediately but after a predetermined long period of time after clutch has disengaged due to some malfunction at the driven side.

DISCLOSURE OF THE INVENTION

In order to solve the above problems, there is provided, as a first means of this invention, a torque limiter having an automatic reset function comprising two bearing rings fitted one on the other, one of the bearing rings being connected to a driving side and the other to a driven side, the bearing rings having surfaces opposed to each other, one of the opposed surfaces being a cylindrical surface, the other of the opposed surfaces being engaging surfaces, a cage formed with a plurality of pockets and mounted between the bearing rings, engaging elements each received in the pockets and adapted to engage the cylindrical surface and the engaging surfaces, one of the cylindrical surface and the engaging surfaces having their portions to be brought into contact with the engaging elements made elastically deformable, and a decelerating means coupled to the cage for transmitting the rotation of the bearing ring connected to the driving side to the cage after decelerating it.

In the second means of this invention, the engaging surfaces form a polygonal surface.

In the third means of this invention, the decelerating means comprises two annular portions fitted one on the other with a gap defined therebetween and adapted to rotate together with the bearing ring connected to the driven side and the cage, respectively, and an eccentricity imparting means for offsetting one of the annular portions to bring it into contact with the other annular portion.

In the fourth means of this invention, the decelerating means comprises two annular portions fitted one on the other with a gap defined therebetween and adapted to rotate together with the bearing ring connected to the driven side and the cage, respectively, and rolling elements press-fitted between the cage and the bearing ring connected to the driving side fop bringing the annular portions into contact with each other by deforming the annular portion adapted to rotate together with the cage.

In the fifth means of this invention, the cylindrical surface and the engaging surfaces have their engaging portions formed of plate-shaped resilient members, and recesses are formed behind the resilient members to permit deformation of the resilient members.

In the sixth means of this invention, the resilient member is provided with a protrusion extending toward the engaging surface or the cylindrical surface.

In the seventh means of this invention, the bearing ring connected to the driven side is integrally provided with a power transmission means such as a gear, a belt groove or a spline.

In the first means, as the bearing rings rotate relative to each other, the engaging elements engage the cylindrical surface and the engaging surface. The clutch is engaged, allowing both rings to rotate together.

In this state, if the bearing ring connected to the driven side is subjected to an excessive load, the cylindrical surface or the engaging surfaces will be elastically deformed, allowing the engaging elements to pass the engaging positions. The clutch thus disengages.

After the engaging elements have passed the engaging positions, they are moved to the next engaging positions by the cage. But since the cage is decelerated by the decelerating means so as to rotate at a slower speed than the bearing ring connected to the driving side, the engaging elements move at a correspondingly slow speed. Thus, it takes a long time until each engaging element reaches the next engaging position. When the engaging elements reach their next engaging positions, the clutch engages again.

In the second means, the engaging surfaces form a polygonal shape. In other words, many engaging surfaces are arranged circumferentially. Thus, many engaging elements can be mounted between the cylindrical surface and the engaging surfaces. This increases the torque transmittable by the torque limiter.

In the third and fourth means, when moving the engaging elements from one engaging position to the next, the cage is driven in the direction of rotation while kept in contact with the annular portions fitted together. As the annular portions rotate while kept in contact with each other, creeping occurs, so that the annular portions move in a circumferential direction relative to each other by a distance equal to the engaging gap δ multiplied by π. Thus, by setting the engaging gap δ at a sufficiently small value with respect to the nominal diameter of the annular portions, the time required for the engaging elements to reach the next engaging positions can be prolonged to a considerable degree.

In the above means, the annular portions may be provided integral with the bearing ring at the driven side and the cage, respectively, or may be provided on members which rotate together with the bearing ring at the driven side and the cage.

In the fifth and sixth means, as the engaging elements approach the narrowest portions between the cylindrical surface and the engaging surfaces, the resilient members are deformed toward the recesses formed behind them. They are deformed markedly because the engaging elements engage the protrusions provided on the resilient members. A large bending stress is thus produced in the resilient members and a large resilient repulsion force is applied from the resilient members to the engaging elements. A maximum transmission torque is thus produced at positions where a maximum stress is produced due to the deformation of the resilient members.

In the seventh means, power can be transmitted directly to an external device through the power transmission means provided on the bearing ring at the driven side. Such a power transmission mechanism is compact and requires a minimum number of parts. Thus, the torque limiter can be coupled to various machines at low cost.

BEST MODES FOR EMBODYING THE INVENTION

Figure 1:
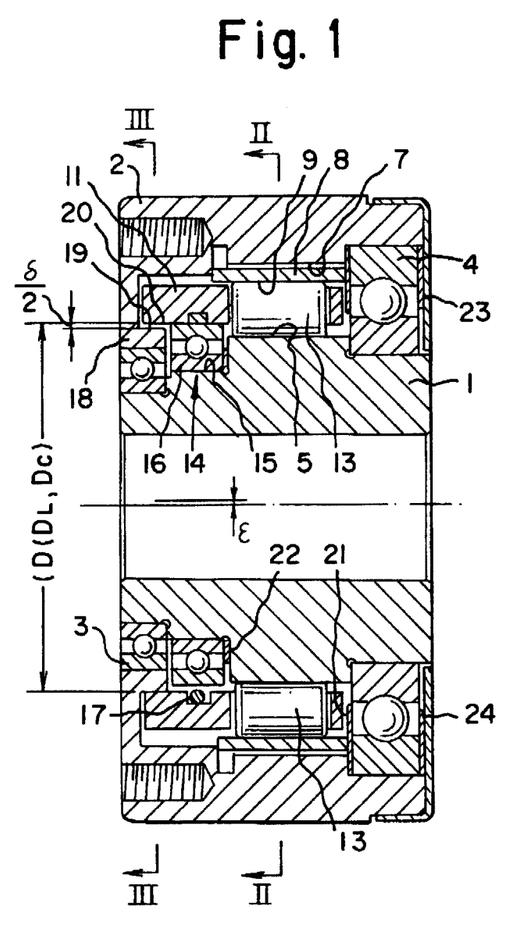
FIG. 1 is a sectional view showing the torque limiter of a first embodiment.
Figure 2:
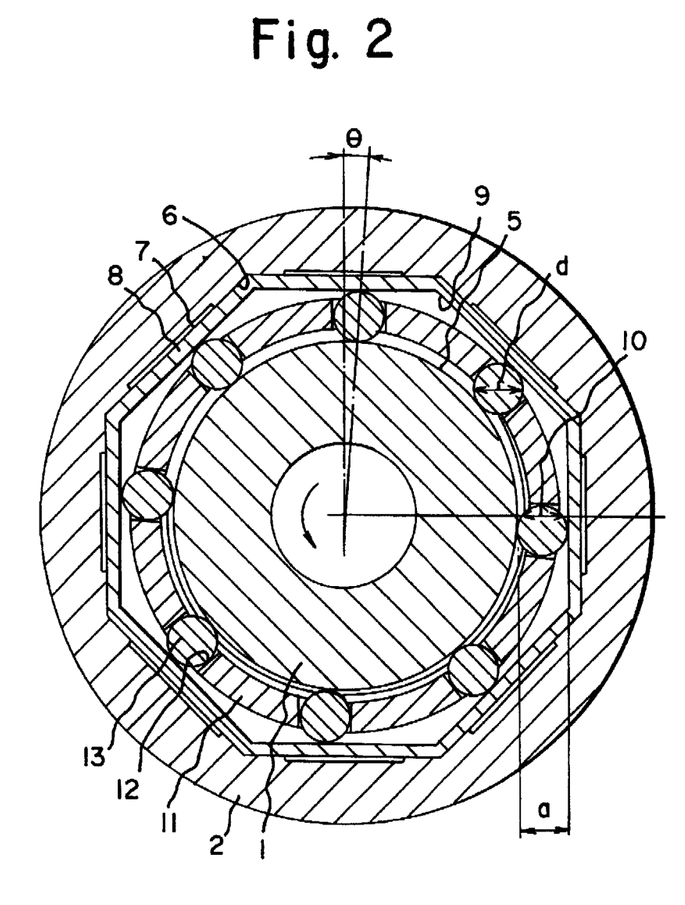
FIG. 2 is a sectional view taken along line II—II of FIG. 1.

FIGS. 1–5 show the torque limiter of the first embodiment. As shown in FIGS. 1 and 2, an inner ring 1 and an outer ring 2 are rotatably supported by bearings 3 and 4 disposed at both ends thereof and held by these bearings so as to be coaxial with each other.

The inner ring 1 has a cylindrical surface 5 on the outer peripheral surface at its central portion. The outer ring 2 has on the inner peripheral surface a polygonal surface 6 which is a substantially regular octagon, so as to be opposite to the cylindrical surface 5. A recess 7 having a predetermined length is formed in each side of the polygonal surface 6 at the central portion thereof with respect to the direction of length of the sides of the polygonal surface 6. A leaf spring 8 in the form of a polygonal ring and having a shape complementary to the polygonal surface 6 is fitted in the outer ring 2.

The leaf spring 8 is fitted tightly or with a slight gap left between the spring and the polygonal surface. Once fitted, it serves as a torsion beam having both ends thereof supported, with its corners in close contact with the respective corners of the polygonal surface 6 and its central parts deformed toward and into the recesses 7.

The inner peripheral surface of the leaf spring 8 is formed by a plurality of engaging surfaces 9. A wedge space is defined between each engaging surface 9 and the cylindrical surface 5 of the inner ring 1. The narrowest portion 10 of the wedge space has a width a which is slightly smaller than the diameter d of rollers 13 which will be described later.

An annular cage 11 is also mounted between the engaging surfaces 9 of the leaf spring 8 and the cylindrical surface 5. The cage is provided in its circumferential surface with a plurality of pockets 12 arranged at equal intervals so as to be disposed opposite to the engaging surfaces 9. The rollers 13 as engaging elements are received in the respective pockets 12.

The rollers 13 have an outer diameter d which is smaller than the width of the space between the engaging surface 9 and the cylindrical surface 5 except at its narrowest portion 10. Thus, as shown in FIG. 1, the rollers 13 engage the engaging surfaces 9 and the cylindrical surface 5 only when they are located near the narrowest portions 10. Thus, this structure serves as clutch having a strut angle of θ.

The rollers 13 can pass the narrowest portion while deforming the leaf spring 8 so as to expand the space between the leaf spring 8 and the cylindrical surface 5. When deformed, the leaf spring 8 serves as a torsion beam having both ends supported. By properly setting the thickness and deflectability of the leaf spring 8, the maximum transmittable torque can be determined with high accuracy. If the load exceeds this maximum torque, the rollers 13 are allowed to pass the narrowest portion, so that the load is released.

As shown in FIG. 1, the inner ring 1 has, on the outer peripheral surface, an eccentric surface 15 having an eccentricity of ε with respect to the cylindrical surface 5. A bearing 16 is mounted on the eccentric surface 15. Thus, its outer peripheral surface is also eccentric from the axis of the inner ring 1 by ε.

The outer peripheral surface of the bearing 16 is in contact with the inner peripheral surface of the cage 11 through an O-ring 17. The cage 11 is thus urged in a diametric direction so as to be held in an eccentric position with respect to the inner ring 1. In this arrangement, the cage 11 is held in its eccentric position by an eccentricity imparting mechanism 14 comprising the eccentric surface 15 and the bearing 16. Alternatively, the eccentricity imparting mechanism may comprise a bearing 16 in the form of an eccentric bearing having an eccentric inner ring and mounted on a surface 15 which is coaxial with the cylindrical surface 5.

The O-ring 17 made of a resilient material, serves to compensate for any dimensional error of the outer peripheral surface of the bearing 16 and the inner peripheral surface of the cage 11, and to adjust the contact pressure between the bearing 16 and the cage 11. The bearing 3 provided between the outer ring 2 and the inner ring 1 supports the load produced due to the fact that the bearing 16 is mounted in an eccentric position, thereby allowing the cage 11 and the outer ring 2 to creep smoothly with respect to each other as described later.

Figure 3:
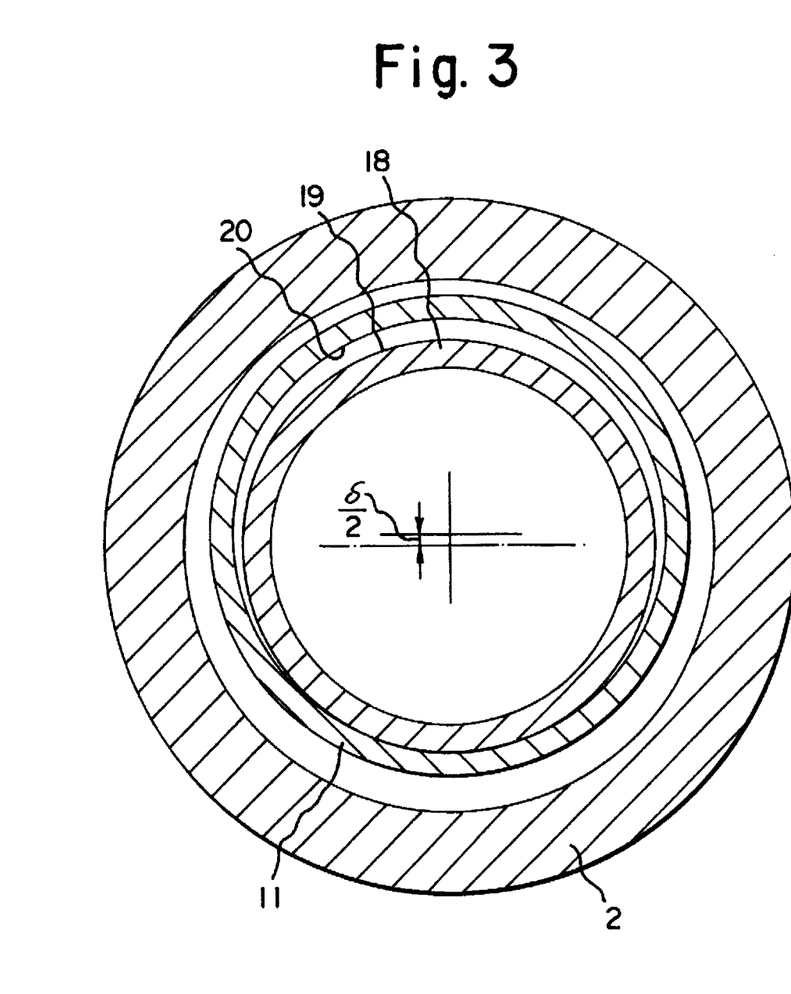
FIG. 3 is a sectional view taken along line III—III of FIG. 1.
Figure 4:
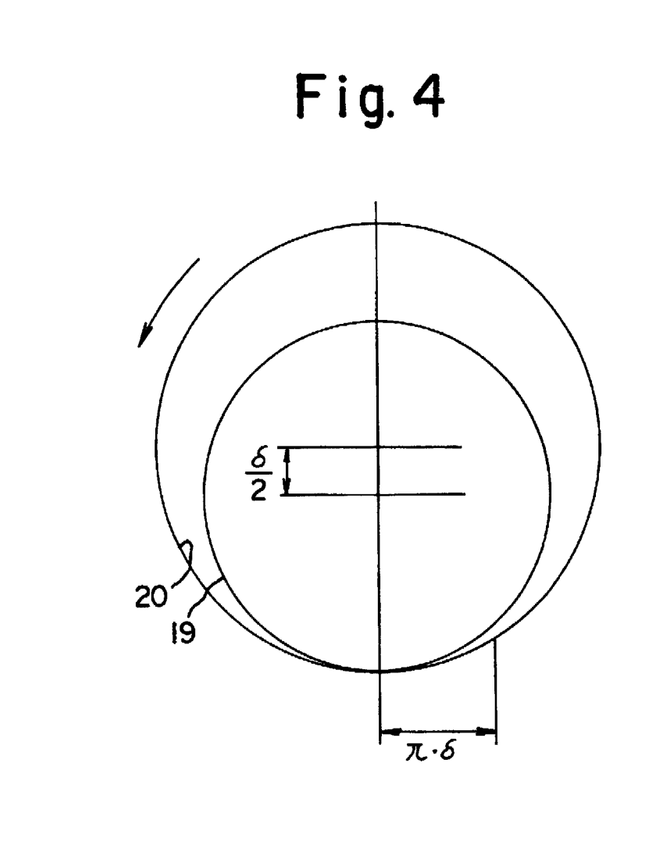
FIG. 4 is a view for explaining the creeping phenomenon in the embodiment.

On the other hand, the outer ring 2 is provided at one end thereof with an inwardly bent L-shaped portion 18. An annular portion 19 is provided on the outer peripheral surface of the bent portion 18 so as to be disposed inside of an annular portion 20 provided on one end of the cage 11. The outer peripheral surface of the annular portion 19 is a cylindrical surface which is coaxial with the outer ring 2. As shown in FIGS. 3 and 4, its outer peripheral surface is partially in contact with the diametrically offset inner peripheral surface of the annular portion 20 of the cage 11.

The difference of engaging gap δ between the outer diameter DL of the annular portion 19 and the inner diameter DC of the annular portion 20 of the cage 11 is set within the range of 1/300–1/2000 of the nominal diameter D of DL and DC. (FIG. 1) In this arrangement, the offset amount of the cage 11, which is diametrically offset by the eccentric surface 15 on the inner ring 1, is restricted by the outer diameter DL of the annular portion 19 and the inner diameter DC of the annular portion 20. Namely, the cage 11 is offset by a distance equal to ½ of the gap δ. Thus, the annular portion 20 of the cage 11 comes into contact with the annular portion 19 of the outer ring 2 at one point only.

In the figures, numerals 21, 22 and 23 indicate washers for preventing the bearing 4 and the bearing 16 from coming into contact with other parts. A sealing plate 24 is provided to seal lubricant.

Having described the structure of the torque limiter of the embodiment, we shall now describe its operation.

As shown in FIGS. 1 and 2, the inner ring 1 is coupled to a driving member and the outer ring 2 is coupled to a driven member. When the inner ring 1 is rotated in the direction of arrow with the rollers 13 in abutment contact with the cylindrical surface 5 of the inner ring 1 and the engaging surfaces 9 of the leaf spring 8 in the form of a polygonal ring, the rollers 13 will wedge into the space between the cylindrical surface 5 and the engaging surfaces 9. A clutch having a strut angle θ is thus established and the outer ring 2 and the inner ring 1 will rotate together.

Figure 5:
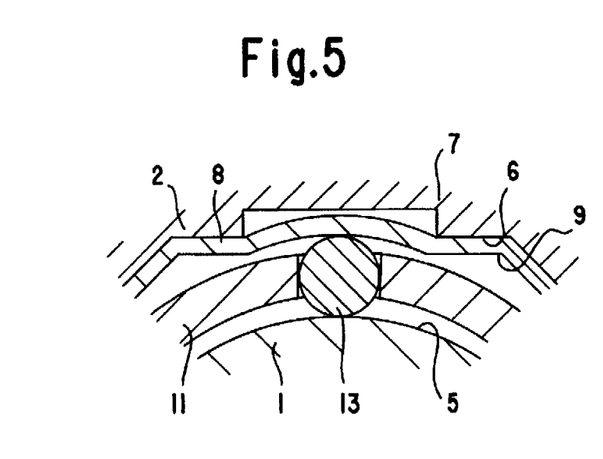
FIG. 5 is an enlarged sectional view of the clutch portion of the same.

As the torque applied to the outer ring 2 increases, the engaging surfaces 9 of the leaf spring 8 forming the clutch deflect into the recesses 7 as shown in FIG. 5, so that the strut angle θ and thus the torque applicable will decrease. If the outer ring 2 is continuously subjected to such an excessive torque, the rollers 13 will move past the narrowest portions 10 to the opposite side of the engaging surfaces 8. Thus, the clutch is disengaged. The torque limiter of this embodiment serves as a safety device which prevents excessive loads by releasing any torque that exceeds a predetermined level.

Once the rollers 13 have gotten out of engagement, they will move at a speed much slower than the inner 1 because the annular portion 20 of the cage 11 having pockets carrying the rollers 13 is kept in contact with the annular portion 19 of the outer ring 2.

As the driving member is driven further and the inner ring 1 rotates relative to the outer ring 2, the cage 11 will rotate or creep, keeping contact with the outer peripheral surface of the annular portion 19 of the outer ring 2 as shown in FIG. 4 by the action of the eccentricity imparting mechanism 14. Namely, as the annular portion 20 of the case 11 rotates one full turn about the annular portion 19 of the outer ring 2, the former shifts relative to the latter In a circumferential direction by a distance equal to gap δ multiplied by π.

The cage 11 rotates in the same direction as the inner ring 1. But due to the creeping of the cage, the number of revolutions Nc of the cage 11 is expressed by Nc=(δ/φD)×N wherein N is the number of revolutions of inner ring.

Because the gap δ is set within the above-described range, the cage 11 rotates at a speed 1/300–1/2000 of the revolving speed of the inner ring 1. If, for example, the number of revolutions per unit time of the inner ring 1 is 1800 rpm, the time T taken for the clutch to engage again after it has been disengaged satisfies the following formula, provided the elastic polygonal ring 8 is octagonal in shape (having eight corners):

$$T=1/\{(1800/60)\times(1/300-1/2000)\times 8\}=1.25-8.33 \text{ sec.}$$

Thus, in the torque limiter of this embodiment, the clutch will disengage if the torque produced exceeds a predetermined value. The torque is not transmitted in this state. But, several seconds later, the clutch re-engages automatically. Thus, even if the driven member should stop due to some abnormal state, enough time is allowed before the clutch re-engages. This torque limiter can be used especially advantageously as a safety device for applications in which even if the driven member should stop due to some malfunction, it usually recovers in a relatively short period of time. Such applications include a screw propeller of a small craft and a compression circuit of a refrigerator compressor.

If the inner ring 1 rotates from the state shown in FIG. 2 in the direction opposite to the direction shown by arrow, no torque is transmitted while the clutch is out of engagement. The clutch will re-engage automatically thereafter. Then the above-described operation is repeated.

The time taken after cutting off torque transmission until the clutch re-engages is adjustable by changing the gap δ between the outer diameter of the annular portion 19 of the outer ring 2 and the inner diameter of the annular portion 20 of the cage 11.

Figure 6:
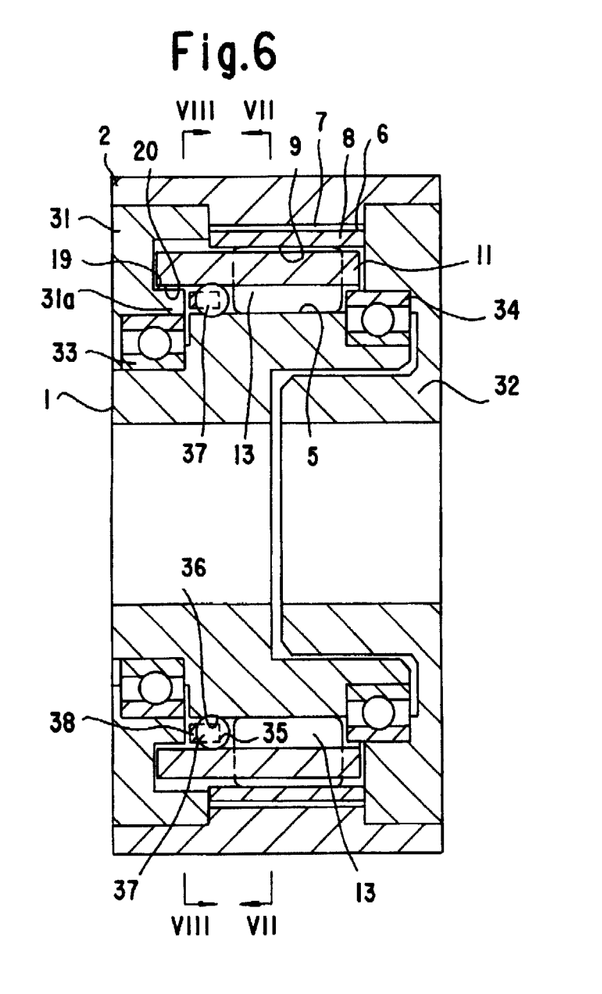
FIG. 6 is a sectional view of a second embodiment.
Figure 7:
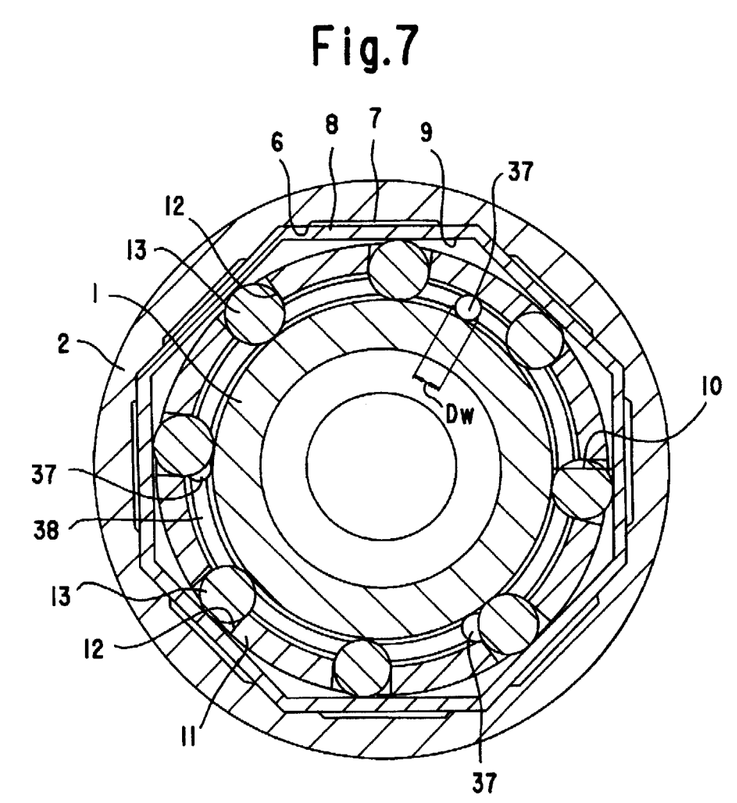
FIG. 7 is a sectional view taken along line VII—VII of FIG. 6.
Figure 8:
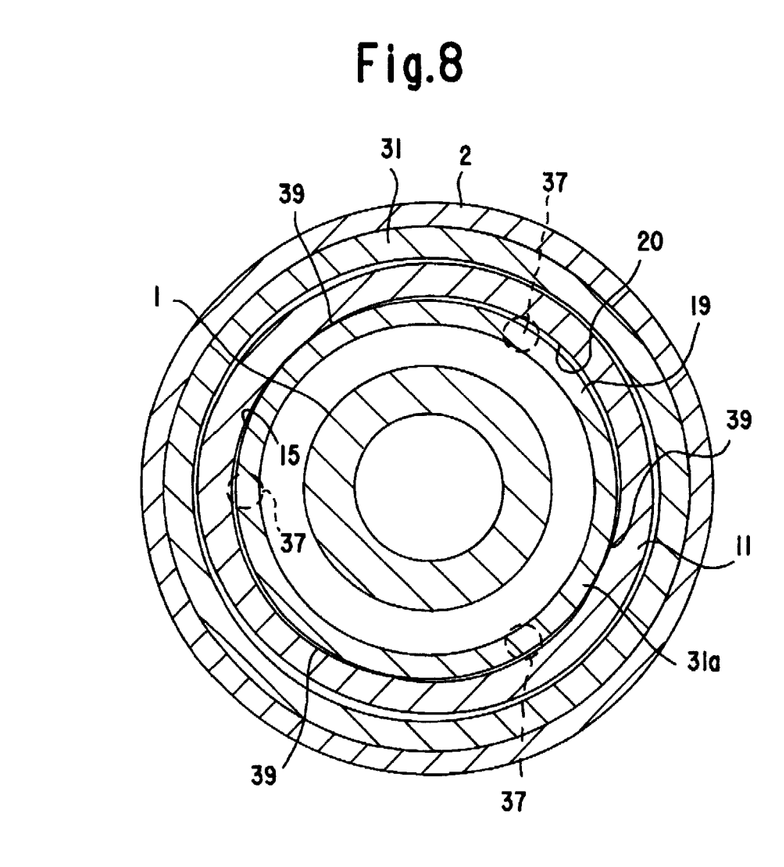
FIG. 8 is a sectional view taken along line VIII—VIII of FIG. 6.

FIGS. 6 to 8 shows a second embodiment.

In this embodiment, the outer ring 2 has a front lid 31 and a rear lid 32 which are press-fitted to the outer ring into the respective ends thereof. The outer ring 2 is rotatably supported by bearings 35 and 34 disposed, respectively, between the front lid 31 and the inner ring 1 and between the rear lid 32 and the inner ring 1.

The front lid 31 is provided on the inner surface thereof with a bent portion 31a which is bent toward the cage 11. The bent portion 31a has on the outer peripheral surface thereof an annular portion 19 which is inserted in an annular portion 20 provided on the front end of the cage 11. A gap δ is provided between the annular portion 19 and the annular portion 20.

The annular portion 20 is provided in its inner peripheral surface with an annular groove 35 that completely encircles the surface. The inner ring 1 is provided on its outer peripheral surface with an annular groove 36 that encircles the surface at a position opposite to the groove 35. Three rolling elements 37 in the form of steel balls are press-fitted between the grooves 35 and 36. They are held by a ball retainer 38 so as to be arranged at circumferentially equal intervals (at the angular intervals of 120 degrees). As they roll in the grooves 35 and 36, the cage 11 is guided in a circumferential direction with respect to the inner ring 1.

The rolling elements 37 have a diameter Dw which is larger than the gap between the groove 35 formed in the cage 11 and the groove 36 formed in the inner ring 1 so that the rolling elements 37 can be press-fitted between the cage 11 and the inner ring 1. By press-fitting the rolling elements 37, as shown in FIG. 8, the annular portion 20 of the cage 11 is deformed with the apexes of deformation disposed at the contact portions with the rolling elements 37. Thus, it comes into contact at its deformed portions 39 with the annular portion 19 of the outer ring 2.

Otherwise, this embodiment is the same in structure as the first embodiment. Thus, like parts are denoted like numerals and their description is omitted.

In the second embodiment, as the inner ring 1 and the outer ring 2 rotate relative to each other, the rollers 13 are wedged into the narrowest portions of the spaces defined between the cylindrical surface and the engaging surfaces 9. These rings thus come into engagement with each other and rotate together. If an excessive load acts on the outer ring 2 in this state, the leaf spring 8 covering the engaging surfaces 9 is deformed, allowing the rollers 15 to pass the narrowest portions. The clutch is now disengaged.

After having passed the narrowest portions, the rollers 13 are then moved toward the next narrowest portions by the cage 11. But since the annular portion 20 of the cage 11 is deformed due to the press-fit of the rolling elements 37 and kept in contact with the annular portion 19 of the outer ring at a plurality of portions thereof, the cage 11 will creep, thus causing the annular portions 19 and 20 to move relative to each other by a distance equal to the engaging gap multiplied by the number π.

In this arrangement, the annular portion 20 of the cage 11 is brought into contact with the annular portion 19 of the outer ring 2 at three portions. Thus, the contact load that acts on each of the annular portions 19 and 20 is dispersed, so that the surface wear of the annular portions 19 and 20 is less severe. This assures a prolonged life of the device.

Figure 9:
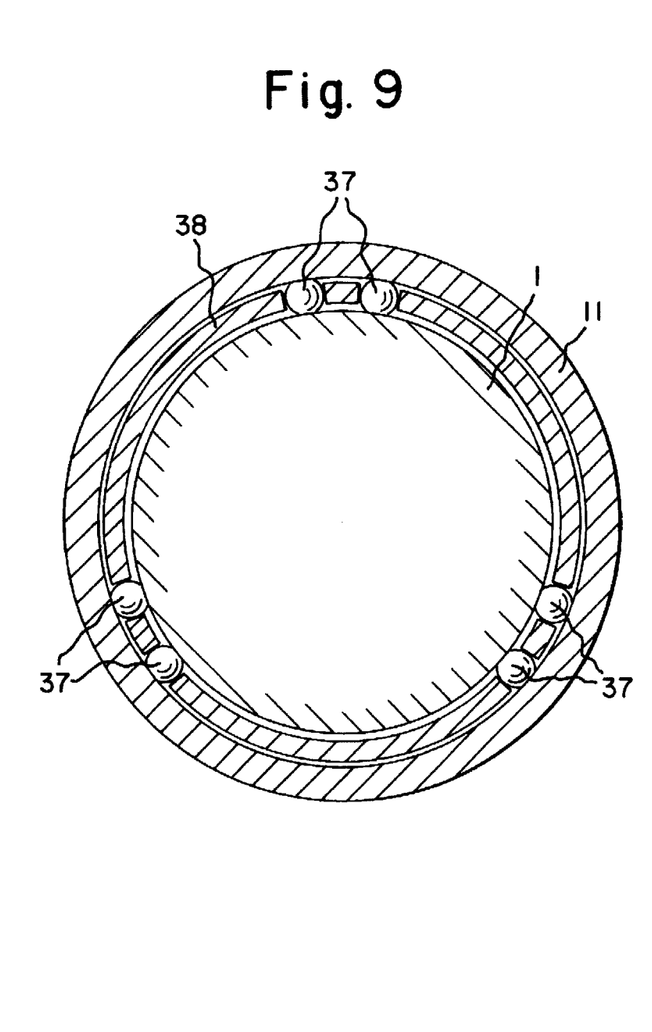
FIG. 9 is a sectional view of a third embodiment.

FIG. 9 shows the third embodiment. In this embodiment, three pairs (six in total) of rolling elements 37 are disposed between the cage 11 and the inner ring 1, the respective pairs being arranged at angular intervals of about 120 degrees. Each of the rolling elements 37 is held in such a position by the retainer 38 so that all the rolling elements will revolve about the inner ring 1 at the same speed.

Figure 10:
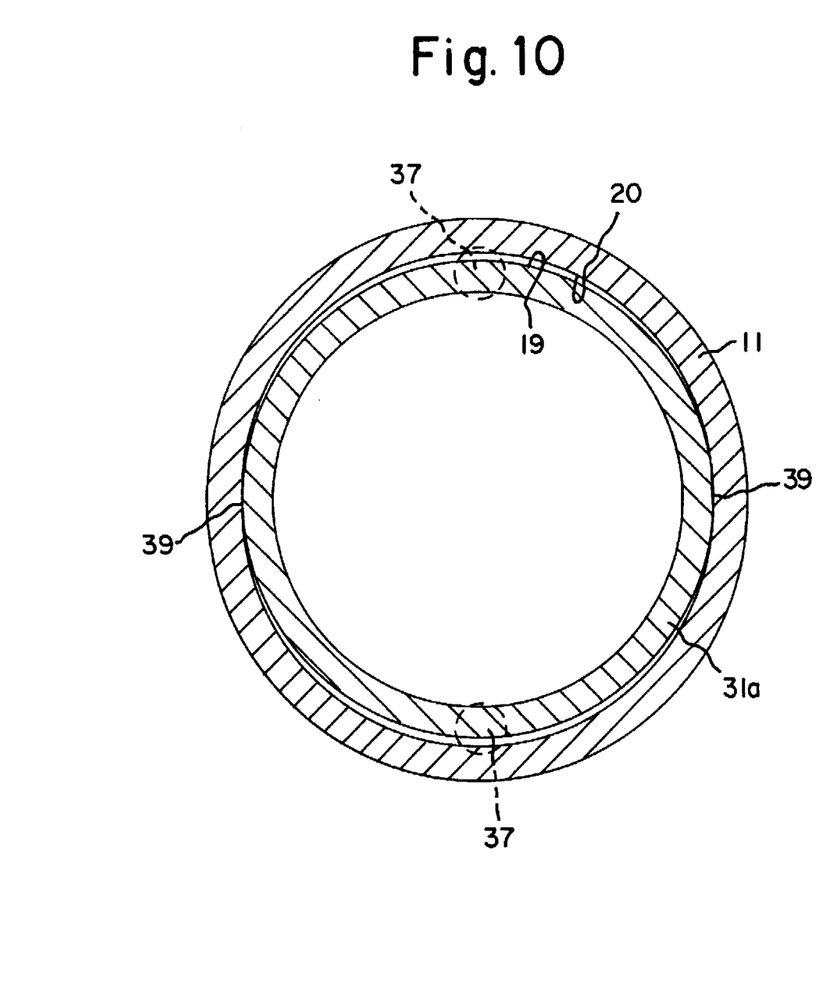
FIG. 10 is a sectional view of a fourth embodiment.

In the fourth embodiment shown in FIG. 10, two rolling elements 37 are mounted between the cage 11 and the inner ring so that the annular portions 19 and 20 will come into contact with each other at two portions. In the alternative, two pairs (four in total) of rolling elements may be mounted, the respective pairs being disposed at an angular interval of 180 degrees.

The annular portions of the cage and the outer ring may be brought into contact with each other not at two or three points but at four or more points by providing a necessary number of rolling elements.

Figure 11:
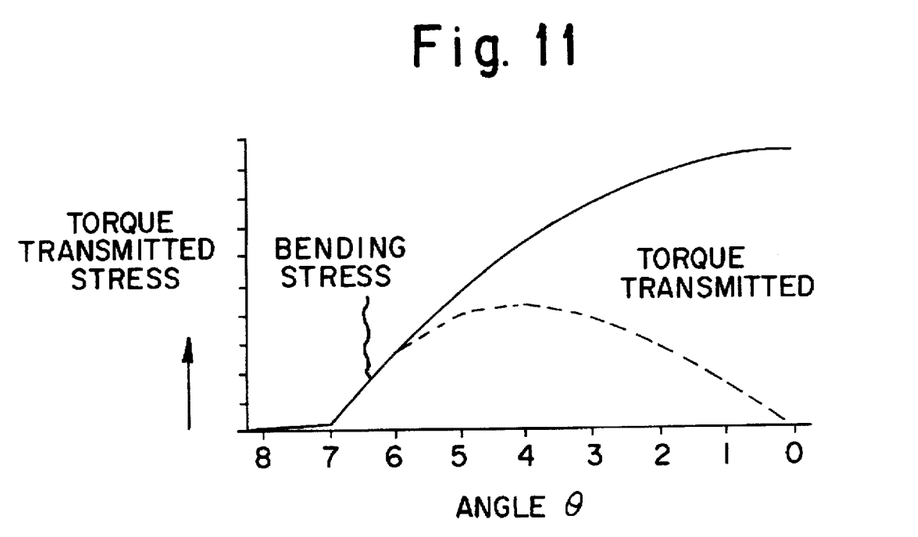
FIG. 11 is a graph showing the relation between the bending stress in the leaf spring and the transmission torque.

In the above embodiments, as shown in FIG. 2, the side faces or the engaging surfaces 9 of the polygonal ring-shaped leaf spring 8 are flat so that the rollers 13 can slide smoothly thereon. Recesses 7 are provided opposite to the central portions of the side faces of the leaf spring 8 so that the leaf spring can be deformed at these portions. Since the leaf spring 8 is supported at both ends, its elastic strength is low at its central portions and high at both ends. Thus, when the rollers 13 are located near the narrowest portions of the spaces between the engaging surfaces 9 and the cylindrical surface, the bending stress produced in the leaf spring 8 is the greatest, as shown in FIG. 11, at the central portions of the leaf spring 8 where the contact angle θ of the rollers 13 is zero. In contrast, the transmittable torque will be the greatest at a certain contact angle and will be zero when the rollers 13 are at the central portions where the elastic repulsion force of the leaf spring 8 is the smallest.

Namely, whereas the actually transmittable torque is determined by the repulsion force produced by the deformation of the leaf spring 8 and the contact angle of the rollers 13, if trials are made in the above arrangement to increase the transmittable torque, the efficiency of torque transmission is low because it is impossible to produce a maximum transmission torque in a region where the leaf spring 8 is subjected to a maximum stress.

Figure 12:
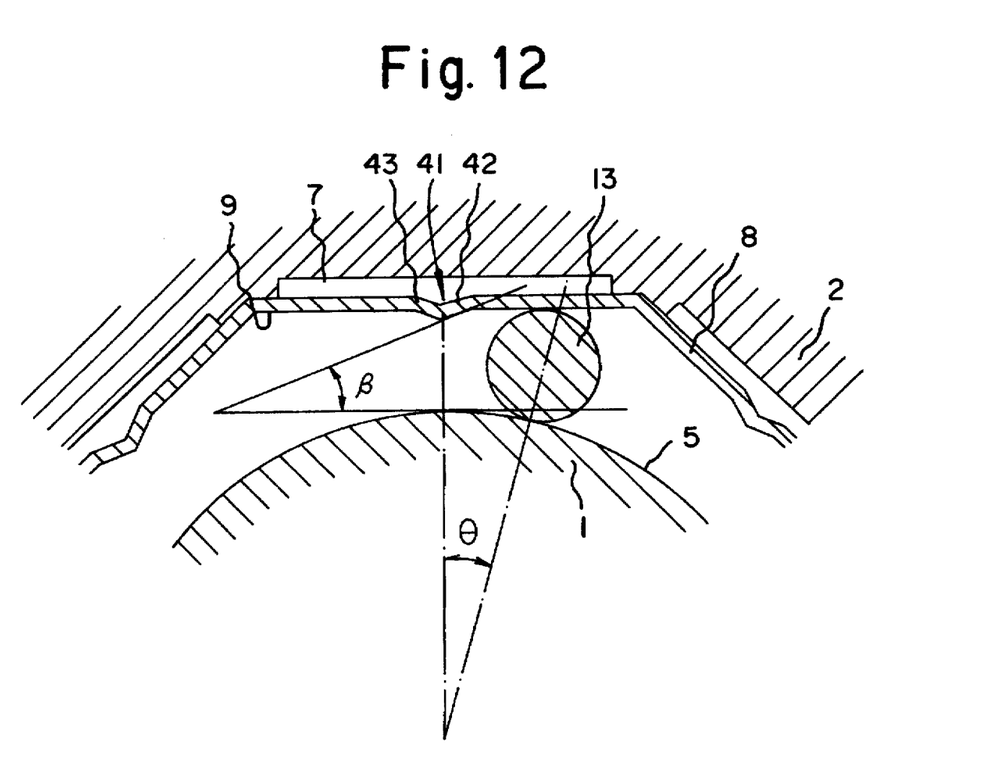
FIG. 12 is a sectional view of a fifth embodiment.

In contrast, the fifth embodiment shown in FIG. 12 is an embodiment in which the shape of the leaf spring is improved in order to solve the above problem. In this embodiment, each engaging surface 9 of the leaf spring 8 is provided at its central portion forming the narrowest portion of the space with a protrusion 41 protruding toward the cylindrical surface 5.

This protrusion 41 comprises two inclined portions 42, 43 provided at the central portion of the leaf spring 8, where the contact angle θ is zero, so as to extend inwardly in symmetrical relation with each other. The angle β between each of the inclined portions 42, 43 and the tangent of the cylindrical surface 5 at a point where the contact angle θ is zero is determined at such a value that when the roller 13 engages the inclined portions 42, 43, it is held between the inclined portions 42, 43 and the cylindrical surfaces 5, so that this device functions as a clutch (the angle should preferably be within the range of 5-15 degrees).

In this arrangement, as the rollers 13 approach the narrowest portions, the leaf spring 8 is deformed toward the recess 7 provided behind it. When the rollers 13 get on the protrusions 41, the inclined portions 42, 43 and the cylindrical surface 5 serve as a clutch with respect to the rollers 13. By the wedging function of this clutch, the leaf spring 8 will be markedly deformed outward, so that a large bending stress is produced in the leaf spring 8. A large repulsion force is thus applied from the leaf spring 8 to the rollers 13.

Figure 13:
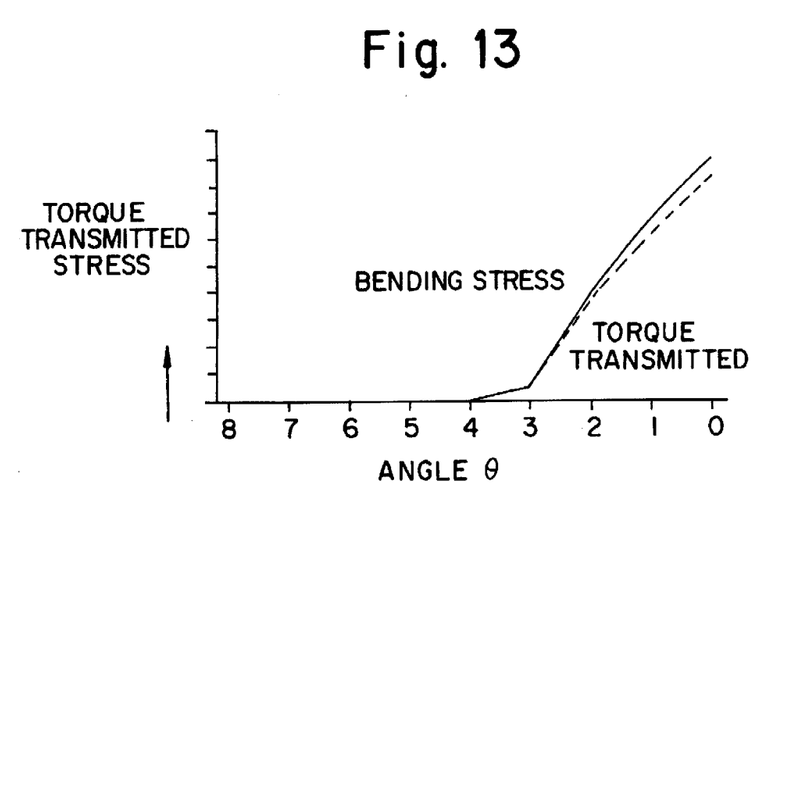
FIG. 13 is a graph showing the relation between the bending stress in the leaf spring and the transmission torque.

Thus, as shown in FIG. 13, the transmittable torque increases in proportion to the bending stress of the leaf spring 8 due to its deformation, which increases as the contact angle θ approaches zero. Since a maximum transmission torque is produced at a point where the bending stress of the leaf spring 8 reaches its maximum, a large torque can be transmitted efficiently.

FIGS. 14 through 19 show a sixth embodiment.

Figure 14:
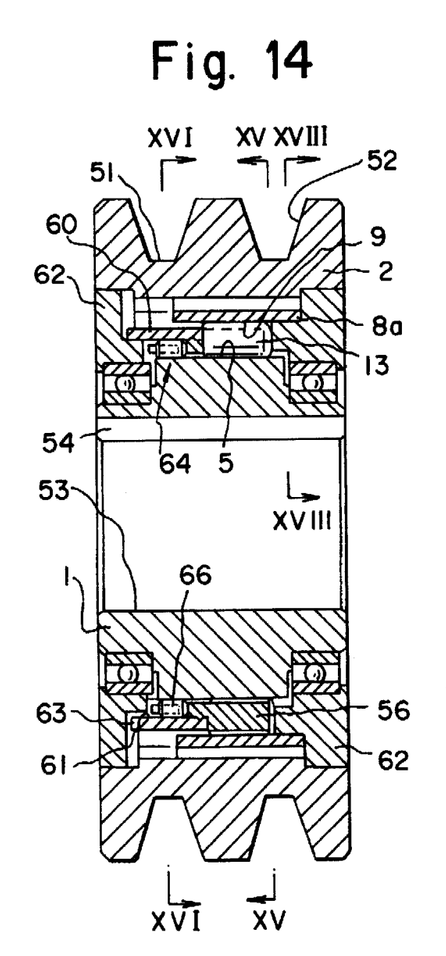
FIG. 14 is a sectional view of a sixth embodiment.
Figure 15:
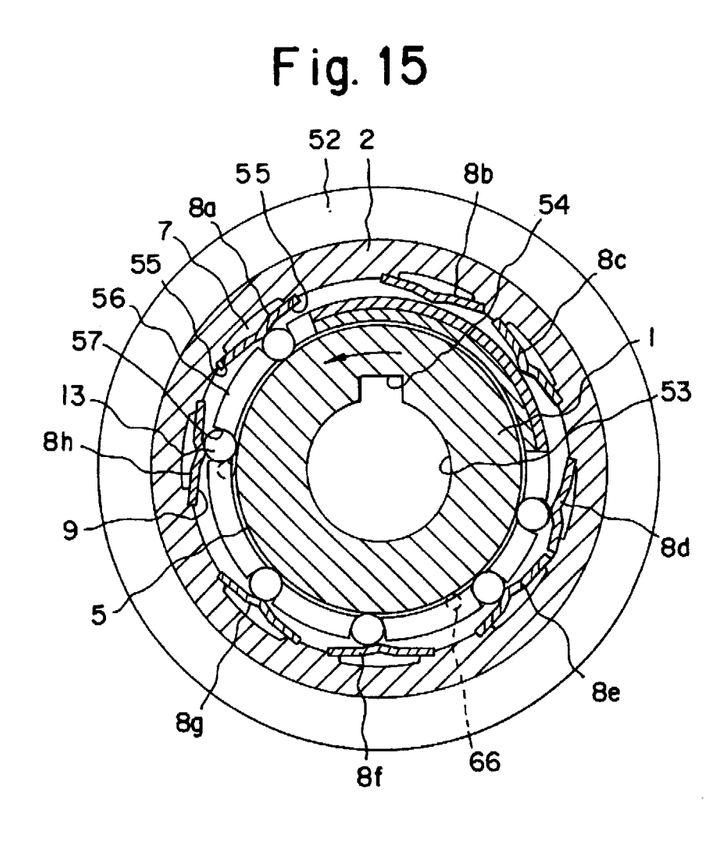
FIG. 15 is a sectional view taken along line XV—SV of FIG. 14.

In this embodiment, as shown in FIG. 14, the outer ring 2 has a plurality of belt grooves 51, 52 formed in its outer peripheral surface. The outer ring 2 itself thus serves as a power transmission pulley. As shown in FIGS. 14 and 15, the inner ring 1, disposed at the driving side, is formed with a bore 53 and a key groove 54 through which a drive shaft of an engine extends. The inner ring 1 is thus directly driven by the engine.

Similar to the above embodiments, a cylindrical surface 5 is formed on the outer peripheral surface of the inner ring 1 at its central portion. Spring seats 55 are formed on the inner peripheral surface 6 of the outer ring 2 opposite to the cylindrical surface 5 at 16 points arranged circumferentially spaced apart from each other. Eight spring leaves 8a, 8b, ... 8h are supported on the respective spring seats 55.

As shown in FIG. 15, with the spring leaves 8a–8h mounted on the outer ring 2, they are arranged so that the pitches (or distances between the adjacent contact points with the rollers 13) are different from one another. The inner surface of each of the spring leaves 8a–8h serves as an engaging surface 9 which defines a wedge space in cooperation with the cylindrical surface 5 of the inner ring 1.

The spring leaves 8a–8h are mounted on the respective spring seats 55 in a more or less tight-fit condition. A gap 7 is defined between each of the spring leaves 8a–8h and the inner surface of the outer ring 2 to allow for deformation of the spring leaves. Each of the spring leaves 8a–8h is provided at its central portion with a protrusion 41 facing the cylindrical surface 5 of the inner ring 1. The spring leaves 8a–8h are deformed when the rollers 13 get into contact with the engaging surfaces 9 at portions near the protrusions 41.

Figure 19:
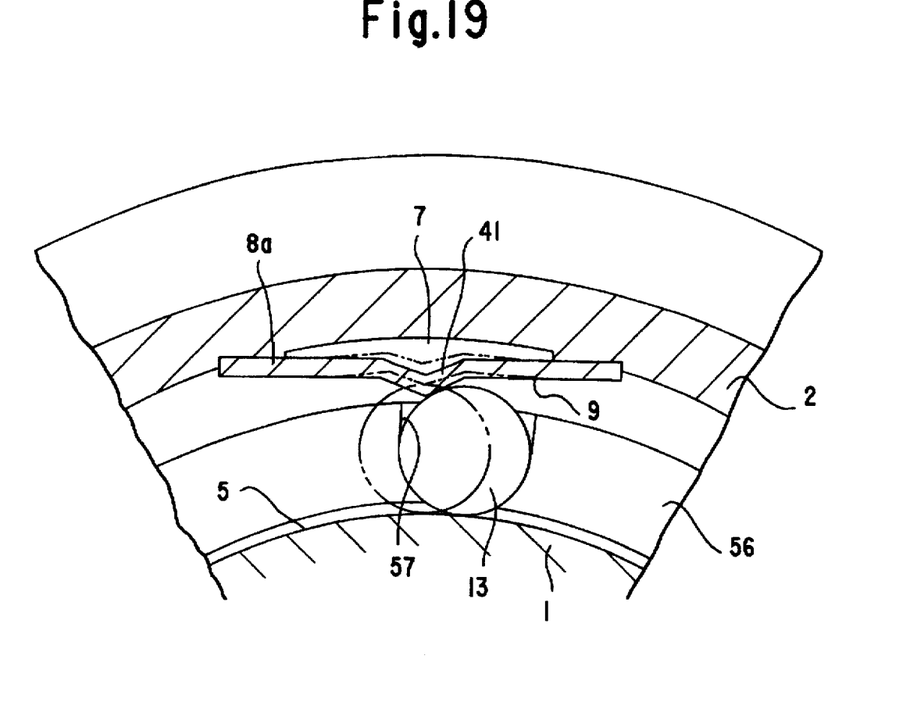
FIG. 19 is a sectional view showing the operation of the clutch of the same.

An annular case 56 is mounted between the spring leaves and the cylindrical surface 5 of the inner ring 1. Eight pockets 57 are formed in the peripheral surface of the case 56 so as to be arranged at the same pitches as the pitches between the spring leaves 8a–8h. A roller 13 as an engaging element is received in each pocket 57. The outer diameter d of the rollers 13 is determined so that as shown in FIG. 19, they can pass through the space between each of the spring leaves 8a–8h and the cylindrical surface 5 by deforming the spring leaves 8a–8h toward the gaps 7.

Figure 17:
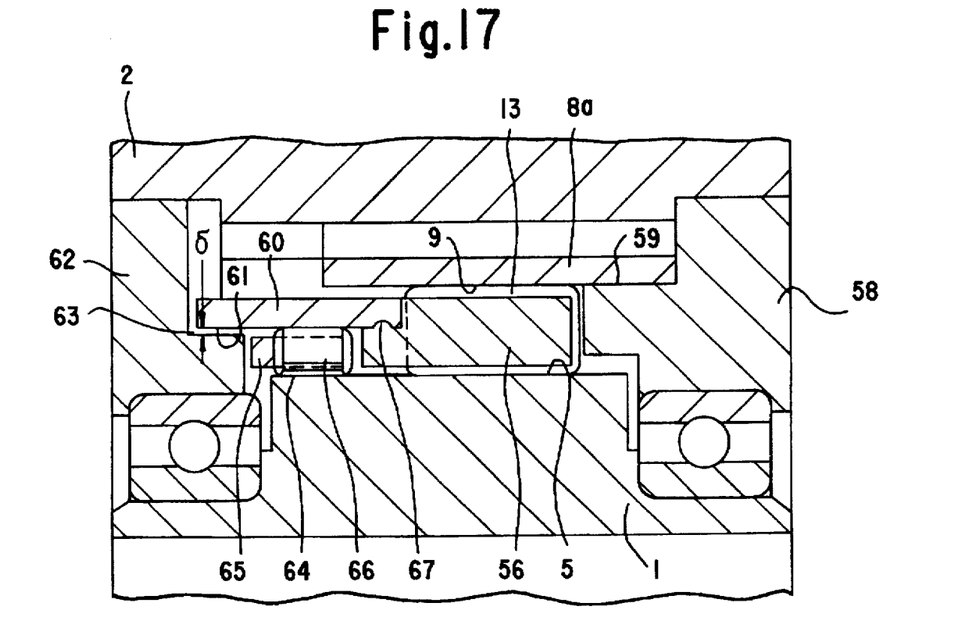
FIG. 17 is an enlarged sectional view of a portion of the same where creeping occurs.
Figure 18:
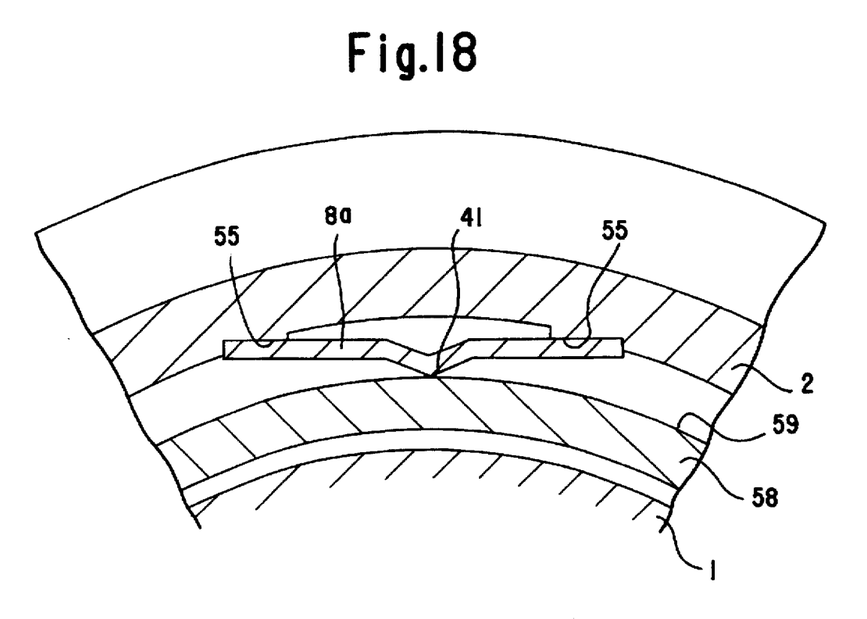
FIG. 18 is a sectional view taken along line XVIII—XVIII of FIG. 14.

As shown in FIGS. 17 and 18, the spring leaves 8a–8h are inserted until they abut a rear lid 58 press-fitted into the rear end of the outer ring 2. The rear lid 58 has a flange 59 by which the spring leaves are resiliently deformed. The flange 59 is dimensioned so that its outer peripheral surface will abut the protrusions 41 provided on the inner surfaces of the spring leaves 8a–8h. This, each spring leaf, supported at three points, i.e. at its protrusion 41 and the contact portions with the spring seats 55, is held in a pre-tensioned, resiliently deformed state. The spring leaves 8a–8h thus assembled will never drop out of the outer ring 2 nor will get out of position due to vibrations or the like.

On the other hand, the cake 56 has its front end protruding toward the bearing 33 and to this protruding end is coupled an annular member mounted coaxially with the inner and outer rings. An annular member 60 has an annular portion 61 on its inner peripheral surface. The annular member 60 and the cage 56 are tight-fitted together by engaging the protrusions and recesses 67 provided at the inner periphery of the annular member 60 and at the end of the case 56, respectively. Thus, the annular member 60 and the cage 56 cannot move axially but are rotatable relative to each other under a predetermined torque.

A front lid 62 having an L-shaped section is press-fitted into the front end of the outer ring 2. On the inner surface of the front lid 62 is provided an annular portion 63 fitted in the annular member 60. A space δ is defined between the annular portion 63 and the annular portion 61 of the annular member 60.

Figure 16:
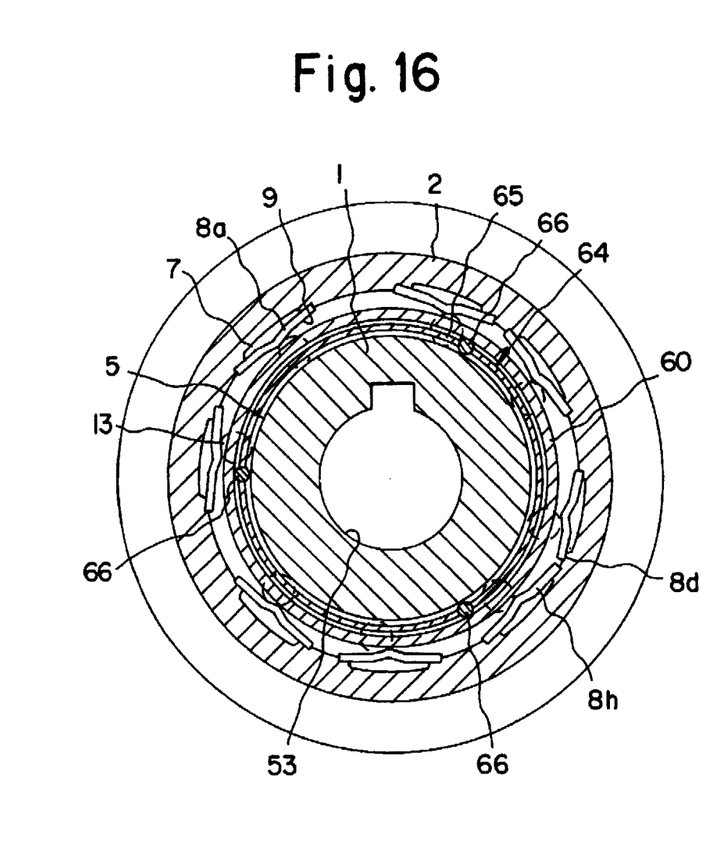
FIG. 16 is a sectional view taken along line XVI—XVI of FIG. 14.

As shown in FIGS. 16 and 17, a cylindrical roller bearing 64 is mounted between the annular member 60 and the cylindrical surface 5 of the inner ring 1. It comprises an annular roller cage 65 and three cylindrical rollers 66 held by the roller cage 65 so as to be circumferentially spaced apart by 120 degrees from each other. As the rollers 66 roll, their rotation causes the cage 56 to rotate relative to the inner ring 1.

The cylindrical rollers 66 have a diameter greater than the radial dimension of the gap defined between the annular member 60 and the inner ring 1 so that they are press-fitted therebetween. Since the cylindrical rollers 66 are press-fitted, the annular member 60 is deformed by the cylindrical rollers in the same manner as shown in FIG. 8. The annular portions 61 and 63 come into contact with each other at these deformed portions.

In this embodiment, the drive shaft of an engine is fitted in the through bore 53 formed in the inner ring 1 and an external device at the driven side are directly coupled to the belt grooves 51, 52 of the outer ring 2 through power transmission belts. As shown in FIG. 15, as the inner ring 1 begins to rotate in the direction of the arrow, with the rollers 13 kept in contact with the cylindrical surface 6 of the inner ring 1 and the spring leaves 8a–8h, the rollers 13 will wedge into the space between the cylindrical surface 5 and the engaging surfaces 9. The clutch is now engaged and the outer ring 2 and inner ring 1 will rotate together. The driving force is thus transmitted from the outer ring 2 directly to the external device.

As shown in FIG. 19 by dotted line, as the torque applied to the outer ring 2 increases in this state, the spring leaves 8a–8h forming the clutch will deflect toward the recesses 7. If the outer ring is subjected to an excessive lead continuously for a prolonged period of time, the rollers 13 will bass the narrowest portions. In this case, the limiter torque T is set to the torque transmitted when all the spring leaves 8a–8h deflect simultaneously.

When the engine keeps turning with no torque transmitted and the inner ring 1 and the outer ring 2 rotate relative to each other, the annular member 60 will creep while rotating about the outer periphery of the annular portion 63 due to contact between the annular portion 61 and annular portion 63. The rollers 13 thus move at a low speed to the next engaging points.

During this movement, as shown in FIG. 19, assuming that the spring leaf 8d first comes again into engagement with the corresponding roller 13, all the other leaf springs 8a–8c and 8e–8h are not in engagement with the respective rollers because the pitches of the adjacent leaf springs are different from one another. Thus, the torque transmitted in this state is smaller than the limiter torque T. Thus, the initially set torque is not transmitted to the outer ring 2 at the driven side.

Similarly, the other spring leaves 8a–8c and 8e–8h come into engagement with the respective rollers one after another. The torque transmitted in each case is small because the eight spring leaves never come into engagement with the rollers simultaneously.

Thus, all the rollers 13 engage and the predetermined torque is transmitted at time intervals eight times longer than the time intervals at which all the rollers 13 engage when the leaf springs 8 are arranged at equal pitches as shown in FIG. 2. This means that it takes eight times longer period for the torque limiter to reset to its original position.

As the rollers 13 move to the next engaging positions between the cylindrical surface 5 and the spring leaves 8a–8h and engage, the cage 56 tends to rotate at about half the speed of the rotation of the inner ring because it is adapted to rotate in the same manner as the roller bearing. But since the annular member 60 is subjected to creeping, it shows a tendency to rotate at a much lower speed than the cage. Thus, there appears a difference in revolving speed therebetween. If the torque produced by the difference in revolving speed exceeds the circumferential locking force determined by the contact pressure between the cage 56 and the annular member 60 at their tight-fit portions, the cage 56 and the annular member 60 begin to rotate relative to each other, thus absorbing the difference in revolving speed. Thus, no significant slip will occur at the contact portion between the annular member 60 and the annular portion 63 or between the rollers 13 and the inner ring 1. Their surfaces are thus less likely to get worn.

In the sixth embodiment, spring leaves are arranged at different pitches from one another. But they may be arranged at equal pitches as in the other embodiments.

In the above embodiments, the inner ring was connected to a driving side and the outer ring to the driven side. But this arrangement will operate exactly in the same way even if the inner ring is connected to the driven side and the outer ring to the driving side.

Also, in the embodiments, the engaging surfaces 9 were formed by leaf springs so that the clutch can be released by deforming the leaf springs. But only portions of the engaging surfaces 9 or the cylindrical surface 5 located near the narrowest portions may be made of a resilient material such as rubber so that the rollers 13 can pass through the narrowest portions by deforming the resilient material.

Industrial Application

As described above, according to this invention, between two bearing rings are formed a cylindrical surface and engaging surfaces which in cooperation provide a plurality of engaging positions at which engaging elements come into engagement. The cage holding the engaging elements rotate at a reduced speed with respect to the bearing ring at the driving side. This makes it possible to rotate the engaging elements at a substantially lower speed, when they are moving from one engaging point toward the next. This means that it takes a longer time after the torque transmission has been cut off by the clutch until the clutch is engaged again. Thus, the torque limiter according to the present invention permits an ample time for the machine to recover from malfunction or for the operator to stop the machine if it has broken down.

We claim:

1. A torque limiter having an automatic reset function comprising two bearing rings fitted one on the other, one of said bearing rings being connected to a driving side member and the other to a driven side member, said bearing rings having surfaces opposed to each other, one of said opposed surfaces being a cylindrical surface, the other of said opposed surfaces being engaging surfaces, a cage formed with a plurality of pockets and mounted between said bearing rings, elastically deformable engaging elements each received in said pockets and adapted to engage said cylindrical surface and said engaging surfaces, said engaging surfaces having their portions to be brought into contact with said engaging elements, and a decelerating means comprising an annular portion provided on said bearing ring connected to said driving side member and an annular portion formed on said cage, said two annular portions being kept in rolling contact with each other so that the cage is rotated at a lower speed than the bearing ring connected to the driven side member while said engaging elements are not in engagement with said bearing ring connected to said driving side member.

2. A torque limiter as claimed in claim 1 wherein said engaging surfaces form a polygonal surface.

3. A torque limiter as claimed in claim 1 or 2 wherein said two annular portions are concentrically fitted one on the other with a gap defined therebetween and adapted to rotate together with said bearing ring connected to the driven side member and said cage, respectively, and said decelerating means further comprises an eccentricity imparting means for offsetting one of said annular portions to bring it into contact with the other annular portion.

4. A torque limiter as claimed in claim 1 or 2 wherein said two annular portions are fitted one on the other with a gap defined therebetween and adapted to rotate together with said bearing ring connected to the driven side member and said cage, respectively, and said decelerating means further comprises rolling elements press-fitted between said cage and said bearing ring connected to the driving side member for bringing said annular portions into contact with each other by deforming the annular portion adapted to rotate together with said cage.

5. A torque limiter as claimed in claim 1 or 2 wherein said engaging surfaces have their engaging portions formed of plate-shaped resilient members, and wherein recesses are formed in said bearing ring adjacent said resilient members on a side thereof opposite said cylindrical surface to permit deformation of said resilient members.

6. A torque limiter as claimed in claim 5 wherein said each resilient member is provided with a protrusion extending toward said cylindrical surface.

7. A torque limiter as claimed in claim 1 wherein the bearing ring connected to the driven side member is integrally provided with a means for transmitting power.

* * * * *